(12) United States Patent
Saito et al.

(10) Patent No.: US 11,783,962 B2
(45) Date of Patent: Oct. 10, 2023

(54) WIRE HARNESS

(71) Applicant: SUMITOMO WIRING SYSTEMS, LTD., Yokkaichi (JP)

(72) Inventors: Ryuta Saito, Yokkaichi (JP); Katsutoshi Izawa, Yokkaichi (JP); Kosuke Tanaka, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/956,329

(22) Filed: Sep. 29, 2022

(65) Prior Publication Data
US 2023/0120271 A1 Apr. 20, 2023

(30) Foreign Application Priority Data
Oct. 18, 2021 (JP) .................................. 2021-170285

(51) Int. Cl.
*H01B 7/00* (2006.01)
*B60R 16/02* (2006.01)
*H02G 3/04* (2006.01)

(52) U.S. Cl.
CPC ....... *H01B 7/0045* (2013.01); *B60R 16/0215* (2013.01); *H02G 3/0418* (2013.01); *H02G 3/0468* (2013.01)

(58) Field of Classification Search
CPC ............ B60R 16/0207; B60R 16/0215; H02G 3/0418; H02G 3/0468; H02G 3/0481; H01B 7/0045
See application file for complete search history.

(56) References Cited

U.S. PATENT DOCUMENTS

| | | | |
|---|---|---|---|
| 7,278,190 B2* | 10/2007 | Fischer | F16L 3/223 248/74.2 |
| 9,482,369 B2* | 11/2016 | Sampson | F16L 3/127 |
| 2007/0128929 A1* | 6/2007 | Oga | F16L 3/1025 439/578 |
| 2014/0196929 A1 | 7/2014 | Okuhara | |
| 2017/0133827 A1* | 5/2017 | Sugino | H05K 9/0098 |
| 2019/0049142 A1* | 2/2019 | Balakrishna | F24F 13/22 |

FOREIGN PATENT DOCUMENTS

| | | | | |
|---|---|---|---|---|
| FR | 2880211 A1 * | 6/2006 | ............ | F16L 3/1025 |
| JP | 2009038899 A * | 2/2009 | ............ | H02G 3/30 |
| JP | 2013-055760 A | 3/2013 | | |

* cited by examiner

*Primary Examiner* — Paresh Paghadal
(74) *Attorney, Agent, or Firm* — Oliff PLC

(57) ABSTRACT

A wire harness including: a wire harness main body including an electric wire and an exterior tube enclosing an outer circumference of the electric wire; a path restricting cover that is attached to an outer circumference of the exterior tube and restricts a path of the wire harness main body; and an attachment attached to an outer circumference of a portion in a lengthwise direction of the path restricting cover.

10 Claims, 8 Drawing Sheets

WIRE HARNESS

BACKGROUND

The present disclosure relates to a wire harness.

Conventionally, a wire harness that includes: a wire harness main body that includes an electric wire member and an exterior member that covers the electric wire member; and a path restricting member that is attached to an outer circumferential surface of the exterior member and is configured to restrict the path of the wire harness main body, has been known as a wire harness for a vehicle (for example, see JP 2013-55760A).

SUMMARY

Incidentally, in the above-described wire harness, it is desired to improve the reliability of the connection of the path restricting member to another member such as the exterior member.

An exemplary aspect of the disclosure provides a wire harness capable of improving the reliability of the connection between the path restricting member and another member.

The wire harness of the present disclosure includes: a wire harness main body including an electric wire and an exterior tube enclosing an outer circumference of the electric wire; a path restricting cover that is attached to an outer circumference of the exterior tube and restricts a path of the wire harness main body; and an attachment attached to an outer circumference of a portion in a lengthwise direction of the path restricting cover, wherein: the path restricting cover includes a first main body that encloses a portion of the outer circumference of the exterior tube, and an insertion port that is open in a direction orthogonal to a lengthwise direction of the first main body and extends along an entire length in the lengthwise direction of the first main body, the path restricting cover includes a connection that is connected to the attachment, the attachment includes a cover that covers an outer circumference of the connection, and the cover includes a through hole that passes through the cover in a radial direction of the exterior tube.

According to the wire harness of the present disclosure, an effect of being able to improve the connection reliability between the path restricting member and other members is exhibited.

DETAILED DESCRIPTION OF EMBODIMENTS

Description of Embodiments of Present Disclosure

Figure 1:
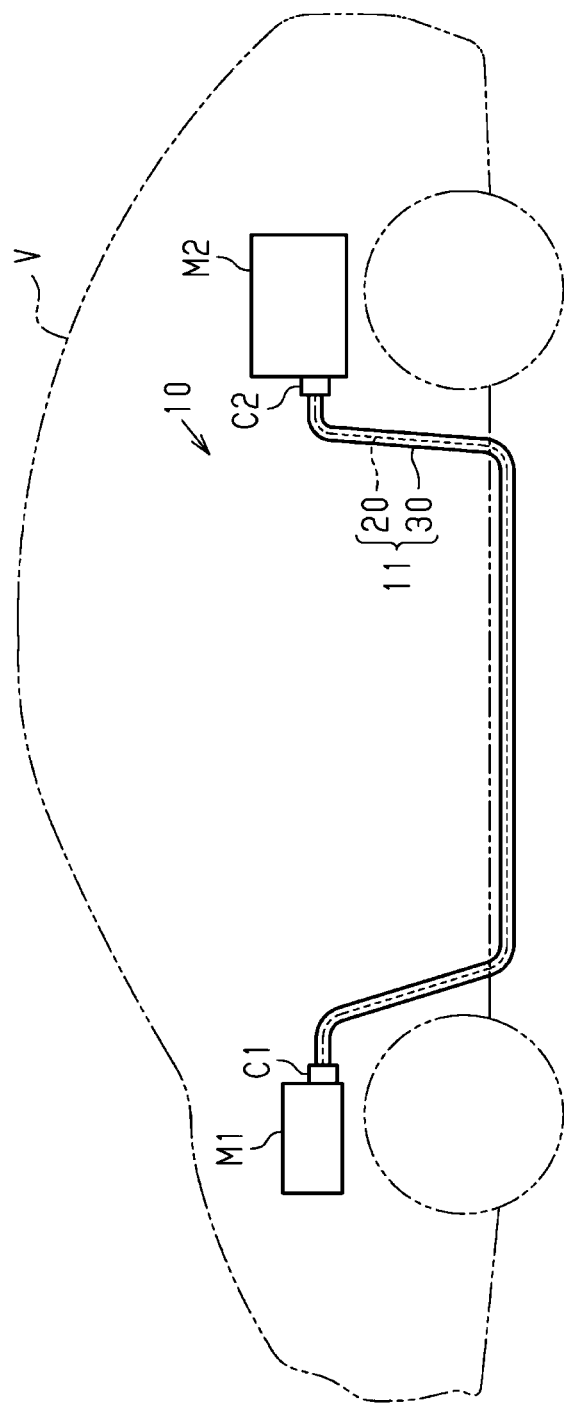
FIG. 1 is a schematic configuration diagram showing a wire harness according to an embodiment.

First, embodiments of the present disclosure will be listed and described.

[1] The wire harness of the present disclosure includes: a wire harness main body including an electric wire member and an exterior member enclosing an outer circumference of the electric wire member; a path restricting member that is attached to an outer circumference of the exterior member and restricts a path of the wire harness main body; and an attachment member attached to an outer circumference of a portion in a lengthwise direction of the path restricting member, in which the path restricting member includes a first main body portion that encloses a portion of the outer circumference of the exterior member, and an insertion port that is open in a direction orthogonal to a lengthwise direction of the first main body portion and extends along the entire length in the lengthwise direction of the first main body portion, the path restricting member includes a connecting portion that is connected to the attachment member, the attachment member includes a covering portion that covers an outer circumference of the connecting portion, and the covering portion includes a through hole that passes through the covering portion in a radial direction of the exterior member.

According to this configuration, the connecting portion of the path restricting member and the covering portion of the attachment member are provided so as to overlap with each other in the lengthwise direction of the wire harness main body. At this time, the covering portion that covers the outer circumference of the connecting portion is provided with a through hole that passes through the covering portion in the radial direction of the exterior member. Accordingly, for example, even if a liquid such as water enters between the outer surface of the connecting portion and the inner surface of the covering portion, the liquid can be discharged to the outside of the mounting member through the through hole. For this reason, it is possible to suppress a case in which liquid accumulates between the outer surface of the connecting portion and the inner surface of the covering portion. Accordingly, it is possible to suitably suppress a case in which the attachment member is detached from the path restricting member due to the weight of the liquid accumulated between the outer surface of the connecting portion and the inner surface of the covering portion. As a result, the connection reliability between the path restricting member and the attachment member can be improved.

[2] It is preferable that the through hole is provided in a portion covering an outer circumference of the first main body portion in a circumferential direction of the covering portion. According to this configuration, the through hole is provided in the portion of the covering portion that covers the outer circumference of the first main body portion. Here, the liquid is more likely to accumulate between the outer surface of the first main body portion and the inner surface of the covering portion than between the insertion port and the inner surface of the covering portion. Accordingly, since the through hole is provided in the portion where liquid is likely to accumulate, the liquid can be suitably discharged to the outside of the attachment member through the through hole. As a result, it is possible to suitably suppress detachment of the attachment member from the path restricting member, and it is possible to improve the connection reliability between the path restricting member and the attachment member.

[3] It is preferable that the through hole is open downward in a vertical direction when the wire harness is mounted in a vehicle. According to this configuration, since the through hole is open downward in the vertical direction, the liquid that has entered between the outer surface of the connection portion and the inner surface of the covering portion can be efficiently discharged to the outside of the attachment member through the through hole. As a result, it is possible to suitably suppress detachment of the attachment member from the path restricting member, and it is possible to improve the connection reliability between the path restricting member and the attachment member.

[4] It is preferable that the covering portion includes a restricting wall that is engageable with a first end surface in the lengthwise direction of the path restricting member in a lengthwise direction of the wire harness main body. According to this configuration, the first end surface in the lengthwise direction of the path restricting member is engaged with the restricting wall of the covering portion in the lengthwise direction of the wire harness body. As a result, relative movement of the path restricting member with respect to the attachment member is suppressed in the lengthwise direction of the wire harness main body. For this reason, it is possible to suppress positional misalignment of the path restricting member with respect to the attachment member in the lengthwise direction of the wire harness main body. As a result, the positional accuracy of the path restricting member with respect to the attachment member can be improved.

[5] It is preferable that the restricting wall is provided at one end portion in a lengthwise direction of the covering portion, the covering portion includes a second end surface of an end portion opposite to the restricting wall out of the two end portions in the lengthwise direction of the covering portion, the through hole is provided spaced apart from the second end surface by a first distance in the lengthwise direction of the wire harness main body, and the first distance is a distance corresponding to a minimum insertion amount of the path restricting member that is needed with respect to the covering portion in the lengthwise direction of the wire harness main body. According to this configuration, the through hole is provided spaced apart from the second end surface in the lengthwise direction of the covering portion by the first distance corresponding to the minimum insertion amount of the path restricting member that is needed with respect to the covering portion. For this reason, the through hole can be used as a confirmation hole for confirming the insertion amount of the path restricting member into the covering portion, and specifically, the insertion amount of the path restricting member in the lengthwise direction of the wire harness main body. That is, even from the outside of the attachment member, the insertion amount of the path restricting member into the covering portion can be confirmed through the through hole. For example, if it can be confirmed that the path restricting member has been inserted up to the through hole through the through hole, it can be confirmed that the path restricting member has been inserted by the minimum insertion amount required for the covering portion or more.

[6] It is preferable that the through hole is provided offset toward the restricting wall in the lengthwise direction of the covering portion. According to this configuration, the through hole is provided in the vicinity of the restricting wall. For example, the through hole is provided in the vicinity of the restricting wall used as a positioning member for the path restricting member in the lengthwise direction of the wire harness main body. For this reason, for example, it is possible to confirm whether or not the path restricting member has been inserted up to the vicinity of the restricting wall in the lengthwise direction of the wire harness main body through the through hole.

[7] It is preferable that the covering portion has a plurality of the through holes, and the plurality of through holes are provided side by side along the lengthwise direction of the covering portion. According to this configuration, since the plurality of through holes are provided side by side along the lengthwise direction of the covering portion, the insertion amount of the path restricting member with respect to the attachment member can be suitably confirmed according to the position of the path restricting member that can be confirmed through the plurality of through holes.

[8] It is preferable that the covering portion is formed in a ring shape enclosing all the way around the outer circumference of the connecting portion and the outer circumference of the exterior member at a portion to which the connecting portion is attached, and the covering portion includes a second main body portion that covers a portion of the outer circumference of the first main body portion and a lid portion that is coupled to the second main body portion. According to this configuration, although the covering portion is ring-shaped, the covering portion is divided into the second main body portion and the lid portion, whereby the attachment member including the covering portion can be retrofitted to the path restricting member and the exterior member. This makes it possible to improve the assembly workability of assembling the wire harness.

[9] It is preferable that the path restricting member includes a first end portion and a second end portion that are two end portions in the circumferential direction of the first main body portion and form the insertion port, the covering portion has a projecting portion that protrudes from an inner surface of the lid portion to the insertion port, and the projecting portion is able to come into contact with at least one of the first end portion and the second end portion in the circumferential direction of the path restricting member. According to this configuration, the projecting portion of the covering portion can come into contact with at least one of the first end portion and the second end portion forming the insertion slot in the circumferential direction of the path restricting member. For this reason, the projecting portion and the first end portion or the second end portion are engaged with each other in the circumferential direction of the path restricting member. As a result, it is possible to suitably suppress rotation of the path restricting member in the circumferential direction with respect to the covering portion.

[10] It is preferable that the exterior member is a corrugated tube having an accordion shape in which a ring-shaped protrusion and a ring-shaped recess are alternatingly continuous with each other in a lengthwise direction of the exterior member, and the projecting portion has a protrusion that enters the ring-shaped recess. According to this configuration, the projecting portion has a protrusion that enters the ring-shaped recess of the corrugated tube. For this reason, it is possible to suppress movement of the corrugated tube with respect to the attachment member in the lengthwise direction of the corrugated tube.

[11] It is preferable that when the path restricting member is a first path restricting member, the attachment member is a second path restricting member that is attached to the outer circumference of the exterior member and restricts the path of the wire harness main body, the connecting portion is provided at an end portion in the lengthwise direction of the first path restricting member, the covering portion is provided at an end portion in the lengthwise direction of the second path restricting member, the first path restricting member restricts a path of a straight section, which is a section having a linear shape in the path of the wire harness main body, and the second path restricting member restricts a path of a bent section, which is a section that is bent in the path of the wire harness main body. According to this configuration, the path of the straight section is restricted by the first path restricting member, and the path of the bent section is restricted by the second path restricting member. As a result, it is possible to prevent the path of the linear portion and the path of the bent section from deviating from the desired paths.

Details of Embodiments of the Present Disclosure

Specific examples of the wire harness of the present disclosure will be described below with reference to the drawings. In each drawing, for convenience of description, portions of the configuration may be exaggerated or simplified. Also, the dimensional proportion of each portion may differ in each drawing. In the present specification, "orthogonal", "parallel", and "total length" include not only the case of being strictly orthogonal, parallel, and the total length, but also the case of being approximately orthogonal, parallel, and the total length within a range in which the actions and effects in the present embodiment are exhibited. In the present specification, "equal" includes not only the case of being exactly equal but also the case where there are some differences between the comparison targets due to the influence of dimensional tolerances and the like. Also, the term "tubular shape" used in the description of the present specification is not limited to a circumferential wall that is formed continuously all the way around, but also a tubular shape formed by combining a plurality of components, and a tubular shape having a notch or the like in a portion in the circumferential direction, as with a C shape. Note that a "tubular" shape includes, but is not limited to, a circular shape, an elliptical shape, and a polygon having sharp or rounded corners. Also, the term "ring shape" used in the description of the present specification may refer to any structure that forms a loop, or a continuous shape with no end portions, as well as a generally loop-shaped structure having a gap, such as a C shape. Note that a "ring-shaped" shape includes, but is not limited to, a circular shape, an elliptical shape, and a polygon having sharp or rounded corners. Also, "opposing" in the present specification means that faces or members are in positions in front of each other, and includes not only a case where they are completely in front of each other but also a case of being at positions where they are partially in front of each other. Also, the term "opposing" in the present specification includes both the case where a member different from two portions is interposed between the two portions and the case where nothing is interposed between the two portions. Note that the present disclosure is not limited to these examples, and is indicated by the claims, and is intended to include all modifications within the meaning and scope equivalent to the claims.

Overall Configuration of Wire Harness 10

A wire harness 10 shown in FIG. 1 is to be mounted in a vehicle V such as a hybrid vehicle or an electric vehicle, for example. The wire harness 10 electrically connects two or more on-board devices to each other. The on-board devices are electric devices mounted in the vehicle V. The wire harness 10 electrically connects, for example, an inverter M1 that is installed in a front portion of the vehicle V and a high-voltage battery M2 that is installed rearward of the inverter M1 in the vehicle V, to each other. The wire harness 10 is formed in an elongated shape so as to extend in a front-rear direction of the vehicle V, for example. The wire harness 10 is routed in the vehicle V so that, for example, an intermediate portion in the lengthwise direction of the wire harness 10 passes outside the vehicle interior such as under the floor of the vehicle V.

The inverter M1 is, for example, connected to a motor (not shown) for driving wheels, which serves as a power source when the vehicle travels. The inverter M1 generates AC power from the DC power of the high-voltage battery M2, and supplies the AC power to a motor. The high-voltage battery M2 is, for example, a battery that is capable of supplying a voltage of several hundred volts.

The wire harness 10 includes a wire harness main body 11. The wire harness main body 11 includes an electric wire member 20 (electric wire) and a tubular exterior member 30 (exterior tube) that encloses the outer circumferential surface of the electric wire member 20. The wire harness 10 has connectors C1 and C2 that are respectively attached to two end portions of the electric wire member 20. One end portion in the lengthwise direction of the electric wire member 20 is connected to the inverter M1 via the connector C1, and the other end portion in the lengthwise direction of the electric wire member 20 is connected to the high-voltage battery M2 via the connector C2.

Figure 2:
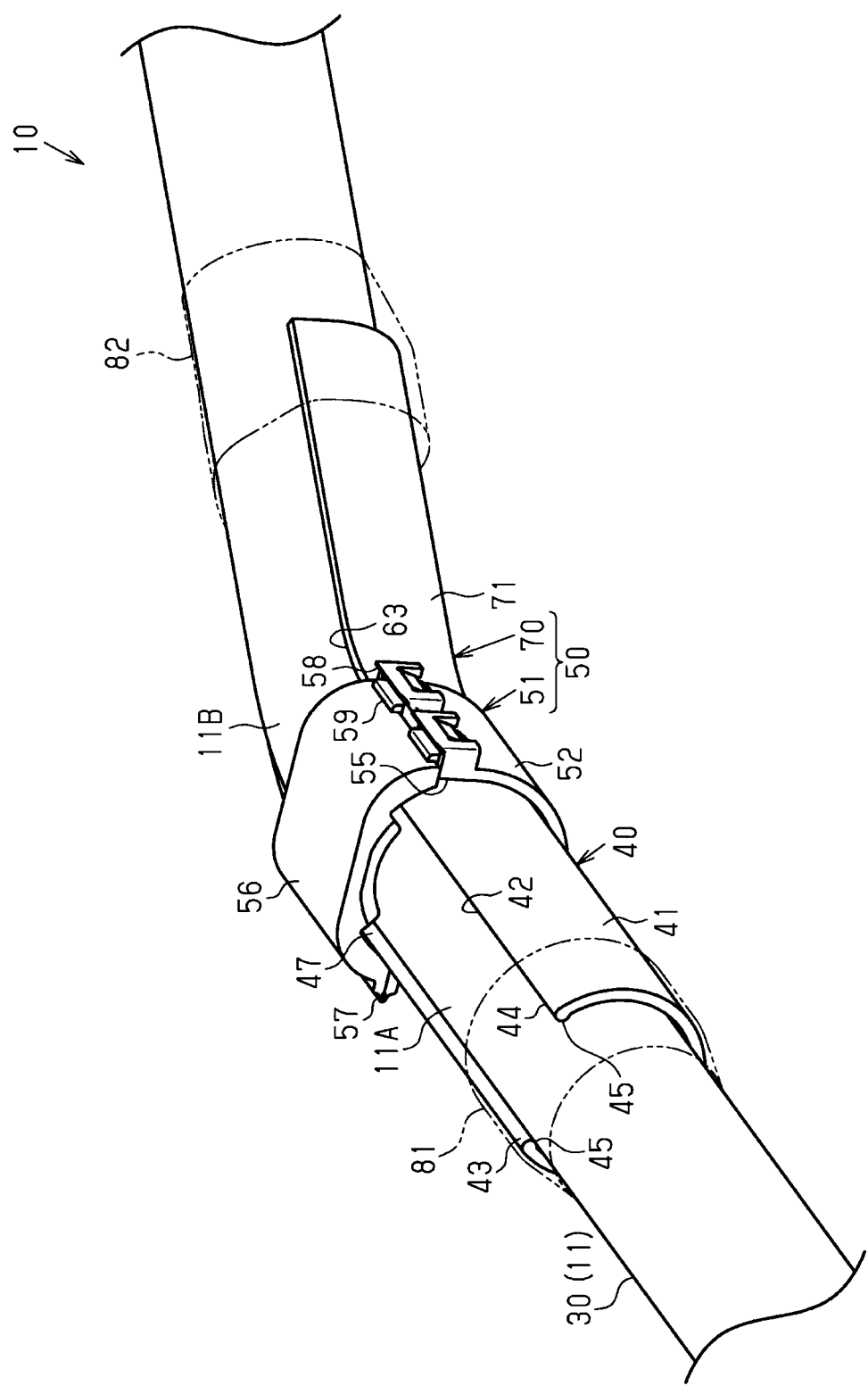
FIG. 2 is a schematic perspective view showing a wire harness according to an embodiment.
Figure 3:
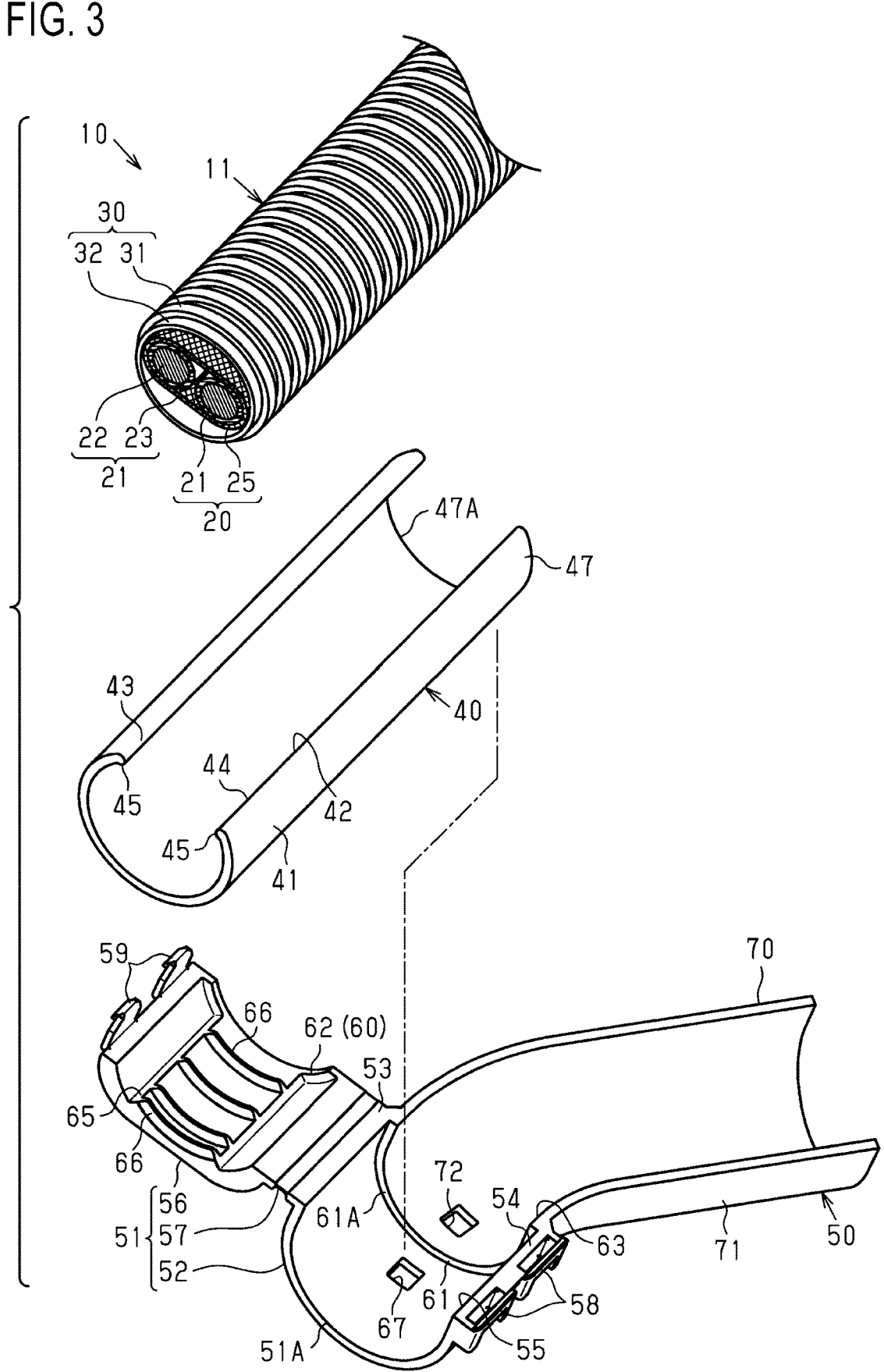
FIG. 3 is a schematic exploded perspective view showing a wire harness according to an embodiment.

As shown in FIGS. 2 and 3, the wire harness 10 includes a first path restricting member 40 (path restricting cover) that is attached to the outer circumferential surface of the exterior member 30 and a second path restricting member 50 (path restricting cover) that is attached to the outer circumferential surface of the exterior member 30. The first path restricting member 40 and the second path restricting member 50 restrict the path along which the wire harness main body 11 is routed. Note that the first path restricting member 40 and the second path restricting member 50 are omitted from FIG. 1.

Configuration of Electric Wire Member 20

Figure 4:
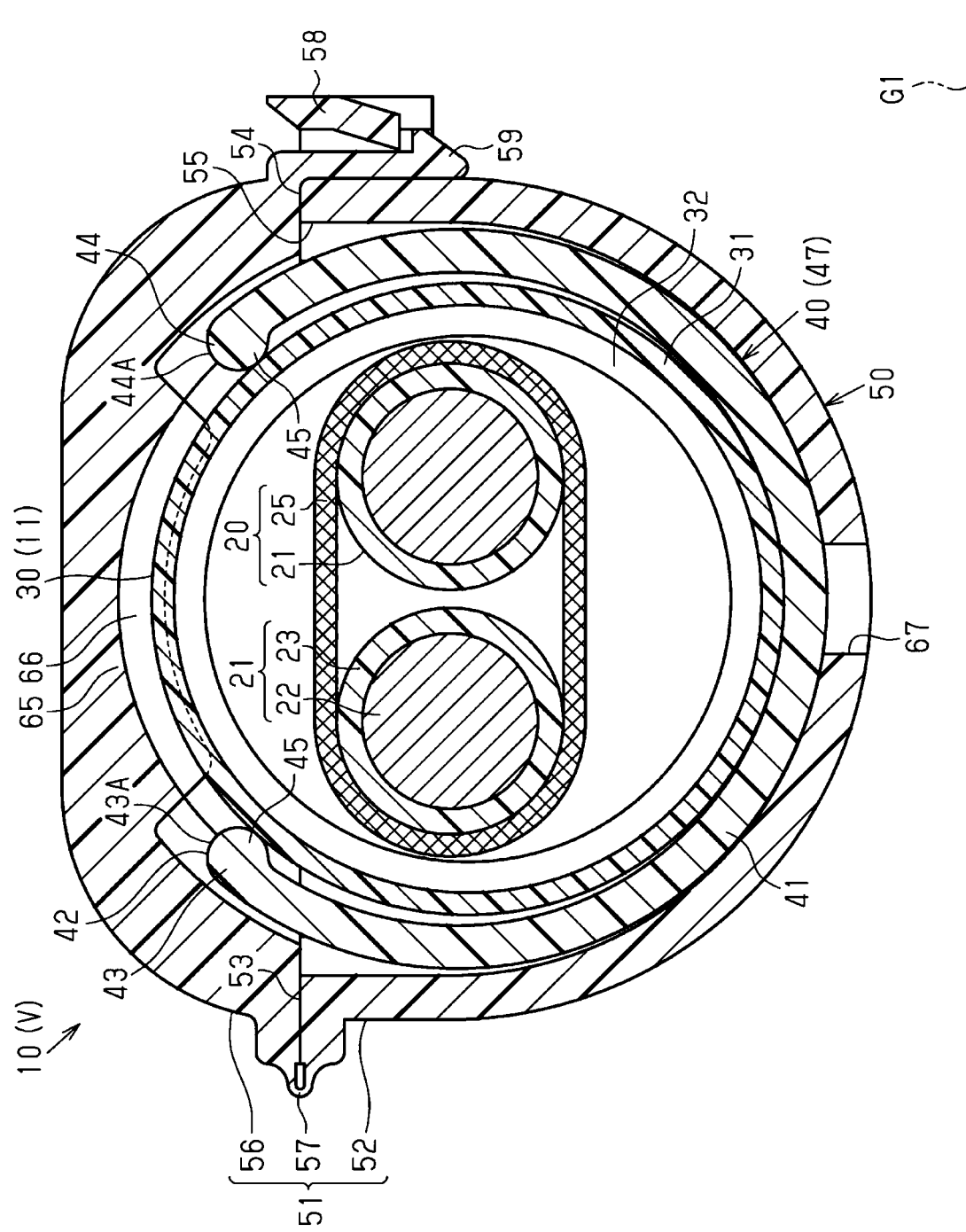
FIG. 4 is a schematic transverse cross-sectional view showing a wire harness according to an embodiment.

As shown in FIGS. 3 and 4, for example, the electric wire member 20 includes one or more electric wires 21 (two in the present embodiment) and a braided member 25 that collectively encloses the outer circumferential surfaces of the plurality of electric wires 21.

As shown in FIG. 4, each electric wire 21 is a coated electric wire that includes a conductive core wire 22 and an insulating coating 23 that encloses the outer circumferential surface of the core wire 22 and has insulating properties. Each electric wire 21 is, for example, a high-voltage electric wire that supports a high voltage and a large current. Each electric wire 21 may be, for example, a non-shielded electric wire that does not have an electromagnetic shield structure therewith, or a shielded electric wire that has an electromagnetic shield structure therewith. Each electric wire 21 in the present embodiment is a non-shielded electric wire.

As the core wire 22, a stranded wire that is constituted by a plurality of metal strands twisted together, a single core wire that is constituted by a single conductor, or the like may be used, for example. As the single core wire, a columnar conductor that is constituted by one columnar metal rod with a solid internal structure, a tubular conductor with a hollow internal structure, or the like may be used, for example. As the core wire 22, a combination of a stranded wire, a columnar conductor, or a tubular conductor may be used. As the material of the core wire 22, a metal material such as a copper-based material or an aluminum-based material may be used, for example.

The insulating coating 23 covers, for example, all the way around the outer circumferential surface of the core wire 22. The insulating coating 23 is constituted by, for example, a resin material that has insulating properties.

The cross-sectional shape of each wire 21 cut along a plane that is orthogonal to the lengthwise direction of each wire 21, that is, the transverse cross-sectional shape of each wire 21, may be any shape. The transverse cross-sectional shape of each electric wire 21 may be, for example, a circular shape, a semicircular shape, a polygonal shape, a square shape, a flat shape, or the like. The transverse cross-sectional shape of each electric wire 21 in the present embodiment is a circular shape.

The braided member 25 has, for example, a tubular shape that collectively encloses the outer circumferential surfaces of the plurality of electric wires 21. As the braided member 25, a braided wire in which a plurality of metal strands are braided or a braided wire in which metal strands and resin strands are braided in combination with each other may be used, for example. As the material of the metal strands, a metal material such as a copper-based material or an aluminum-based material may be used, for example. Although not shown in the drawings, the two end portions of the braided member 25 in the lengthwise direction are grounded at, for example, the connectors C1 and C2 (see FIG. 1).

Configuration of Exterior Member 30

As shown in FIG. 3, the exterior member 30 has a tubular shape that encloses all the way around the outer circumferential surface of the electric wire member 20. The exterior member 30 in the present embodiment is formed in a cylindrical shape. The exterior member 30 is, for example, provided with a circumferential wall that is formed so as to be continuous all the way around the circumferential surface of the exterior member 30. The exterior member 30 is, for example, sealed all the way around the circumferential surface of the exterior member 30. The exterior member 30 has, for example, a function of protecting the electric wire member 20 from flying objects and water droplets.

The exterior member 30 has, for example, flexibility and is easily bendable. Examples of the flexible exterior member 30 include a resin corrugated tube and a rubber waterproof cover. The exterior member 30 of the present embodiment is a resin corrugated tube having an accordion structure in which ring-shaped protrusions 31 and ring-shaped recesses 32 are provided alternatingly and continuously along the lengthwise direction of the exterior member 30. Each of the ring-shaped protrusions 31 and the ring-shaped recesses 32 has, for example, a ring shape that encircles the exterior member 30 once in the circumferential direction. As the material of the exterior member 30, for example, a synthetic resin such as polyolefin, polyamide, polyester, or ABS resin can be used. Note that in FIGS. 1 and 2, the exterior member 30 is shown simplified for the sake of simplification of the drawings.

Configuration of First Path Restricting Member 40 and Second Path Restricting Member 50

As shown in FIG. 2, each of the first path restricting member 40 and the second path restricting member 50 holds the exterior member 30. Each of the first path restricting member 40 and the second path restricting member 50 is harder than, for example, the exterior member 30. Each of the first path restricting member 40 and the second path restricting member 50 has a hardness that makes it more difficult to bend in a direction orthogonal to the lengthwise direction of the wire harness main body 11 compared to the exterior member 30. As a result, each of the first path restricting member 40 and the second path restricting member 50 restricts the path of the wire harness main body 11. For example, each of the first path restricting member 40 and the second path restricting member 50 assists the exterior member 30 so that the wire harness main body 11 does not deviate from the desired path by bending due to its own weight or the like. The exterior member 30 is more difficult to bend than, for example, in a state where the first path restricting member 40 and the second path restricting member 50 are not attached.

The first path restricting member 40 is provided along a portion in the lengthwise direction of the wire harness main body 11. For example, the first path restricting member 40 is attached to the outer circumferential surface of the exterior member 30 along a straight section 11A, which is a straight section of the path of the wire harness main body 11. The first path restricting member 40 restricts the path of the wire harness main body 11 in the straight section 11A. Here, the straight section 11A is a section in which the path of the wire harness main body 11 extends straight in one direction. Note that one or more first path restricting members 40 are provided depending on the path of the wire harness main body 11.

The second path restricting member 50 is provided along a portion in the lengthwise direction of the wire harness main body 11. For example, the second path restricting member 50 is attached to the outer circumferential surface of the exterior member 30 along a bent section 11B, which is a bent section of the path of the wire harness main body 11. The second path restricting member 50 restricts the path of the wire harness main body 11 in the bent section 11B. Here, the bent section 11B is a section in which the path of the wire harness main body 11 is bent two-dimensionally or three-dimensionally. Note that one or more second path restricting members 50 may be provided depending on the path of the wire harness main body 11.

Configuration of First Path Restricting Member 40

As shown in FIG. 4, the first path restricting member 40 covers part of the outer circumference of the exterior member 30 in the circumferential direction of the exterior member 30. The first path restricting member 40 has a cylindrical shape that covers the outer circumference of the exterior member 30 in a portion in the circumferential direction of the exterior member 30. The transverse cross-sectional shape of the first path restricting member 40 is C-shaped overall. The first path restricting member 40 covers, for example, a range larger than half of the outer circumference of the exterior member 30. The transverse cross-sectional shape of the first path restricting member 40 is, for example, uniform over the entire length in the lengthwise direction of the first path restricting member 40. As shown in FIG. 2, the first path restricting member 40 extends along the path of the straight section 11A, and is formed in a shape extending linearly in one direction, for example.

The first path restricting member 40 is made of metal or resin, for example. The first path restricting member 40 in the present embodiment is made of resin. As the material of the first path restricting member 40, a synthetic resin such as polypropylene, polyamide, or polyacetal may be used, for example. The first path restricting member 40 may be manufactured using a well-known manufacturing method such as extrusion molding or injection molding, for example.

As shown in FIG. 3, the first path restricting member 40 has a first main body portion 41 (first main body) that covers part of the outer circumference of the exterior member 30, and an insertion port 42 that opens in a direction orthogonal to the lengthwise direction of the first main body portion 41. The first path restricting member 40 has a first end portion 43 and a second end portion 44 which are both ends in the circumferential direction of the first main body portion 41 and form an insertion port 42.

As shown in FIG. 4, the first main body portion 41 forms the main part of the first path restricting member 40. The thickness in the radial direction of the first main body portion 41 is, for example, uniform in the circumferential direction of the first path restricting member 40. The transverse cross-sectional shape of the first main body portion 41 is formed, for example, in a shape that extends along the outer surface of the exterior member 30. The transverse cross-sectional shape of the first main body portion 41 is formed, for example, in an arc shape.

The first end portion 43 and the second end portion 44 are provided on mutually opposite sides in the circumferential direction of the first main body portion 41. The first end portion 43 and the second end portion 44 are provided spaced apart from each other with the insertion port 42 interposed therebetween in the circumferential direction of the first main body portion 41. In other words, the gap between the first end portion 43 and the second end portion 44 in the circumferential direction of the first path restricting member 40 is formed as the insertion port 42. As described above, the first path restricting member 40 is formed in a C shape having the insertion port 42 in a portion in the circumferential direction of the first main body portion 41.

The opening width of the insertion slot 42, that is, the shortest distance between the first end portion 43 and the second end portion 44 is smaller than, for example, the outer diameter of the exterior member 30. As shown in FIG. 3, the insertion port 42 extends along the lengthwise direction of the first main body portion 41 over the entire length in the lengthwise direction of the first main body portion 41. That is, the insertion port 42 is formed so as to be open in a direction orthogonal to the lengthwise direction of the first main body portion 41 and to be open at both ends in the lengthwise direction of the first main body portion 41.

By inserting the exterior member 30 into the insertion port 42 from a direction orthogonal to the lengthwise direction of the first path restricting member 40, the first path restricting member 40 is elastically deformed and the opening width of the insertion port 42 is increased. When the exterior member 30 is inserted into the first path restricting member 40, the first path restricting member 40 elastically returns to return to its original shape. As a result, the opening width of the insertion port 42 is smaller than the outer diameter of the exterior member 30, and therefore the first path restricting member 40 is attached to the outer circumference of the exterior member 30.

As shown in FIG. 4, the first end portion 43 has a leading end 43A. The second end portion 44 has a leading end 44A. The leading ends 43A and 44A form the insertion port 42. The leading ends 43A and 44A are formed in a curved shape when viewed from the lengthwise direction of the first path restricting member 40. That is, the transverse cross-sectional shapes of the leading ends 43A and 44A are formed in curved shapes. The transverse cross-sectional shapes of the leading ends 43A and 44A of the present embodiment are formed in semicircular shapes.

The first path restricting member 40 has, for example, protruding portions 45 protruding from the inner surfaces of the first end portion 43 and the second end portion 44. Each protruding portion 45 protrudes toward the exterior member 30 inserted into the first path restricting member 40 and can come into contact with the outer surface of the exterior member 30. The protruding portions 45 are in contact with, for example, the outer surfaces of the ring-shaped protrusions 31 of the exterior member 30. The two protruding portions 45 protrude from the inner surfaces of the leading ends 43A and 44A, for example. The transverse cross-sectional shape of each protruding portion 45 is formed, for example, into a curved shape. The transverse cross-sectional shape of each protruding portion 45 of the present embodiment is formed in a semicircular shape. Each protruding portion 45 extends, for example, along the lengthwise direction of the first path restricting member 40 over the entire length in the lengthwise direction of the first path restricting member 40.

Each protruding portion 45 presses the exterior member 30 from the outside of the exterior member 30, for example. The exterior member 30 is elastically sandwiched by the two protruding portions 45 and the first main body portion 41. As a result, the connection of the first path restricting member 40 to the exterior member 30 is strengthened. Accordingly, the first path restricting member 40 attached to the outer circumference of the exterior member 30 is suppressed from moving in the lengthwise direction of the exterior member 30.

As shown in FIG. 3, the first path restricting member 40 has a connecting portion 47 that is to be connected to the second path restricting member 50. The connecting portion 47 is provided, for example, at the end portion in the lengthwise direction of the first path restricting member 40. The connecting portion 47 has a first end surface 47A in the lengthwise direction of the first path restricting member 40.

Configuration of Second Path Restricting Member 50

As shown in FIG. 2, the second path restricting member 50 is attached to the outer circumference of the exterior member 30 in the bent section 11B. The second path restricting member 50 is bent along the shape of the bent section 11B. The second path restricting member 50 is made of, for example, metal or resin. The second path restricting member 50 of the present embodiment is made of resin. As the material of the second path restricting member 50, for example, a synthetic resin such as polypropylene, polyamide, or polyacetal can be used. The second path restricting member 50 can be manufactured using a known manufacturing method such as injection molding.

The second path restricting member 50 has a covering portion 51 (cover) that covers a portion in the lengthwise direction of the first path restricting member 40, and a path restricting portion 70 that is attached to the outer circumference of the exterior member 30. The second path restricting member 50 is, for example, a single component in which the covering portion 51 and the path restricting portion 70 are formed in one piece. The covering portion 51 is provided, for example, at one end portion in the lengthwise direction of the second path restricting member 50. The covering portion 51 has a second main body portion 52 (second main body) and a lid portion 56 (lid) coupled to the second main body portion 52. The path restricting portion 70 has a third main body portion 71. The third main body portion 71 is formed in one piece continuously with the second main body portion 52. Here, as shown in FIG. 4, in the second path restricting member 50, for example, the second main body portion 52 is arranged on the lower side in the vertical direction relative to the lid portion 56 when the wire harness 10 is mounted in the vehicle V. The second path restricting member 50 is provided, for example, so that the second main body portion 52 of the covering portion 51 opposes the ground G1 when the wire harness 10 is mounted on the vehicle V.

Configuration of Covering Portion 51

As shown in FIG. 2, the covering portion 51 is provided, for example, so as to overlap with the connecting portion 47 in the radial direction of the exterior member 30. That is, in the wire harness 10, one end portion in the lengthwise direction of the first path restricting member 40 and one end portion in the lengthwise direction of the second path restricting member 50 are provided so as to overlap with each other in the lengthwise direction of the wire harness main body 11.

The covering portion 51 encloses, for example, the outer circumference of the connecting portion 47 of the first path restricting member 40. The covering portion 51 is formed, for example, in a ring shape that encloses all the way around the connecting portion 47 and the exterior member 30 at the portion to which the connecting portion 47 is attached. The covering portion 51 extends, for example, along the path of the straight section 11A, and is formed in a shape extending linearly in one direction.

As shown in FIG. 4, the second main body portion 52 covers, for example, a portion of the outer circumference of the exterior member 30 in the circumferential direction of the exterior member 30. The second main body portion 52 covers, for example, a portion of the outer circumference of the first path restricting member 40 in the circumferential direction of the first path restricting member 40. The second main body portion 52 has a tubular shape that covers the outer circumference of the first path restricting member 40 at a portion in the circumferential direction of the first path restricting member 40. The second main body portion 52 covers, for example, the outer circumference of the first main body portion 41 of the first path restricting member 40. The second main body portion 52 covers, for example, the lower side in the vertical direction of the first main body portion 41. The second main body portion 52 covers, for example, a range larger than half of the outer circumference of the first main body portion 41. The transverse cross-sectional shape of the inner surface of the second main body portion 52 is formed, for example, in a shape corresponding to the outer surface of the first main body portion 41. The transverse cross-sectional shape of the inner surface of the second main body portion 52 is formed, for example, into a curved shape. The transverse cross-sectional shape of the inner surface of the second main body portion 52 is U-shaped overall.

The second main body portion 52 has a third end portion 53 and a fourth end portion 54, which are the two ends in the circumferential direction of the second main body portion 52. The second main body portion 52 has a first accommodation port 55 formed by the third end portion 53 and the fourth end portion 54. The first accommodation port 55 is an opening between the third end portion 53 and the fourth end portion 54. As shown in FIG. 3, the first accommodation port 55 is open in a direction orthogonal to the lengthwise direction of the second main body portion 52. The first accommodation port 55 extends along the lengthwise direction of the second main body portion 52, over the entire length in the lengthwise direction of the second main body portion 52. The opening width of the first accommodation port 55, that is, the shortest distance between the third end portion 53 and the fourth end portion 54 is, for example, equal to the outer diameter of the first path restricting member 40, or is greater than the outer diameter of the first path restricting member 40. The exterior member 30 and the first path restricting member 40 are inserted into the first accommodation port 55 along a direction orthogonal to the lengthwise direction of the second path restricting member 50.

The lid portion 56 is formed in one piece with, for example, the second main body portion 52. The transverse cross-sectional shape of the inner surface of the lid portion 56 is formed, for example, in a shape corresponding to the outer surface of the exterior member 30. The transverse cross-sectional shape of the inner surface of the lid portion 56 is formed, for example, in a shape corresponding to the outer surface of the first path restricting member 40. The transverse cross-sectional shape of the inner surface of the lid portion 56 is formed, for example, in an elliptical arc shape or an ovoid arc shape. The lid portion 56 is formed, for example, in the shape of a substantially semi-elliptical cylinder. Here, "oval" in the present specification is a shape consisting of two parallel lines having substantially equal lengths and two semicircles.

The lid portion 56 covers the first accommodation port 55 of the second main body portion 52. The lid portion 56 covers the first accommodation port 55, for example, in only the covering portion 51 in the lengthwise direction of the second path restricting member 50. In other words, the lid portion 56 is provided on only the covering portion 51 of the second path restricting member 50, and is not provided on the path restricting portion 70.

The covering portion 51 has, for example, a hinge portion 57 that connects the second main body portion 52 and the lid portion 56. The hinge portion 57 connects one end in the circumferential direction (here, the third end portion 53) of the second main body portion 52 and one end in the circumferential direction of the lid portion 56. One or more (in this embodiment, two) lock portions 58 are provided at the other end in the circumferential direction (here, the fourth end portion 54) of the second main body portion 52. One or more (in this embodiment, two) claw portions 59 are provided at the other end in the circumferential direction of the lid portion 56.

The second main body portion 52 and the lid portion 56 are relatively rotatable about the hinge portion 57. The lid portion 56 is rotatable between an open position shown in FIG. 3 and a closed position shown in FIG. 2, using the hinge portion 57 as an axis. As shown in FIG. 4, the claw portions 59 catch on the lock portions 58 when the lid portion 56 is in the closed position. As a result, the lid portion 56 is held in the closed position. In this manner, the second main body portion 52 and the lid portion 56 are coupled to each other. In a state where the second main body portion 52 and the lid portion 56 are coupled to each other, the covering portion 51 forms a ring shape that collectively encloses the outer circumferences of the exterior member 30 and the connecting portion 47. The lid portion 56 covers the first accommodation port 55 of the second main body portion 52 in the closed position. The lid portion 56 covers the insertion portion 42 at the connecting portion 47, for example, in the closed position.

As shown in FIG. 3, the covering portion 51 has, for example, a restricting wall 60 that can engage with the first end surface 47A in the lengthwise direction of the first path restricting member 40 in the lengthwise direction of the wire harness main body 11. The restricting wall 60 protrudes, for example, inward in the radial direction of the covering portion 51 from the inner surface of the covering portion 51. The restricting wall 60 extends, for example, along the circumferential direction of the covering portion 51. The restricting wall 60 extends, for example, all the way around the circumferential surface of the covering portion 51. The restricting wall 60 is provided at one end in the lengthwise direction of the covering portion 51.

The restricting wall 60 has, for example, a main-body-side restricting wall 61 formed on the inner surface of the second main body portion 52, and a lid-side restricting wall 62 formed on the inner surface of the lid portion 56. The main-body-side restricting wall 61 and the lid-side restricting wall 62 are provided, for example, at the same position as each other in the lengthwise direction of the wire harness main body 11.

Figure 5:
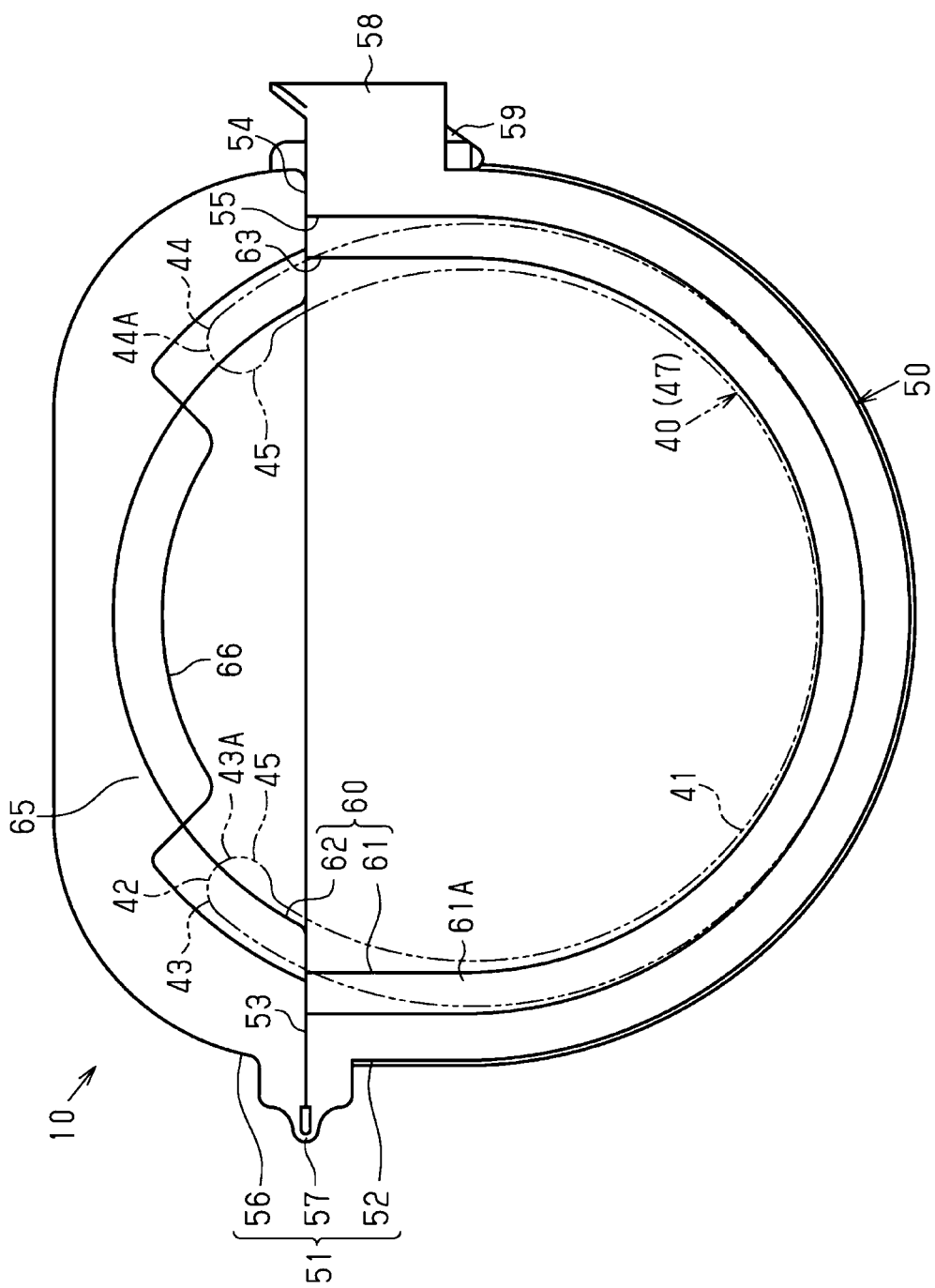
FIG. 5 is a schematic front view showing a wire harness according to an embodiment.

As shown in FIG. 5, the main-body-side restricting wall 61 protrudes inward in the radial direction from the inner surface of the second main body portion 52. The main-body-side restricting wall 61 extends over the entire circumference of the second main body portion 52, for example, in the circumferential direction of the covering portion 51. The transverse cross-sectional shape of the inner surface of the main-body-side restricting wall 61 is formed in the same shape as the transverse cross-sectional shape of the inner surface of the second main body portion 52. The transverse cross-sectional shape of the inner surface of the main-body-side restricting wall 61 of the present embodiment is formed in a U shape. The transverse cross-sectional shape of the inner surface of the main-body-side restricting wall 61 is formed to be one size smaller than the transverse cross-sectional shape of the inner surface of the second main body portion 52, for example.

The main-body-side restricting wall 61 has a second accommodation port 63 that is open in a direction orthogonal to the lengthwise direction of the second main body portion 52. The second accommodation port 63 is in communication with the first accommodation port 55. The opening width of the second accommodation port 63 is smaller than the opening width of the first accommodation port 55. The opening width of the second accommodation port 63 is smaller than, for example, the outer diameter of the first path restricting member 40.

As shown in FIG. 3, the main-body-side restricting wall 61 is provided, for example, at the end portion connected to the third main body portion 71 out of the two ends in the lengthwise direction of the second main body portion 52. The main-body-side restricting wall 61 extends, for example, along the lengthwise direction of the wire harness main body 11. The main-body-side restricting wall 61 extends from the end portion of the second main body portion 52, for example, over the entire length in the lengthwise direction of the third main body portion 71. For example, a level difference is formed by the main-body-side restricting wall 61 at the boundary portion between the inner surface of the second main body portion 52 and the inner surface of the third main body portion 71.

Figure 6:
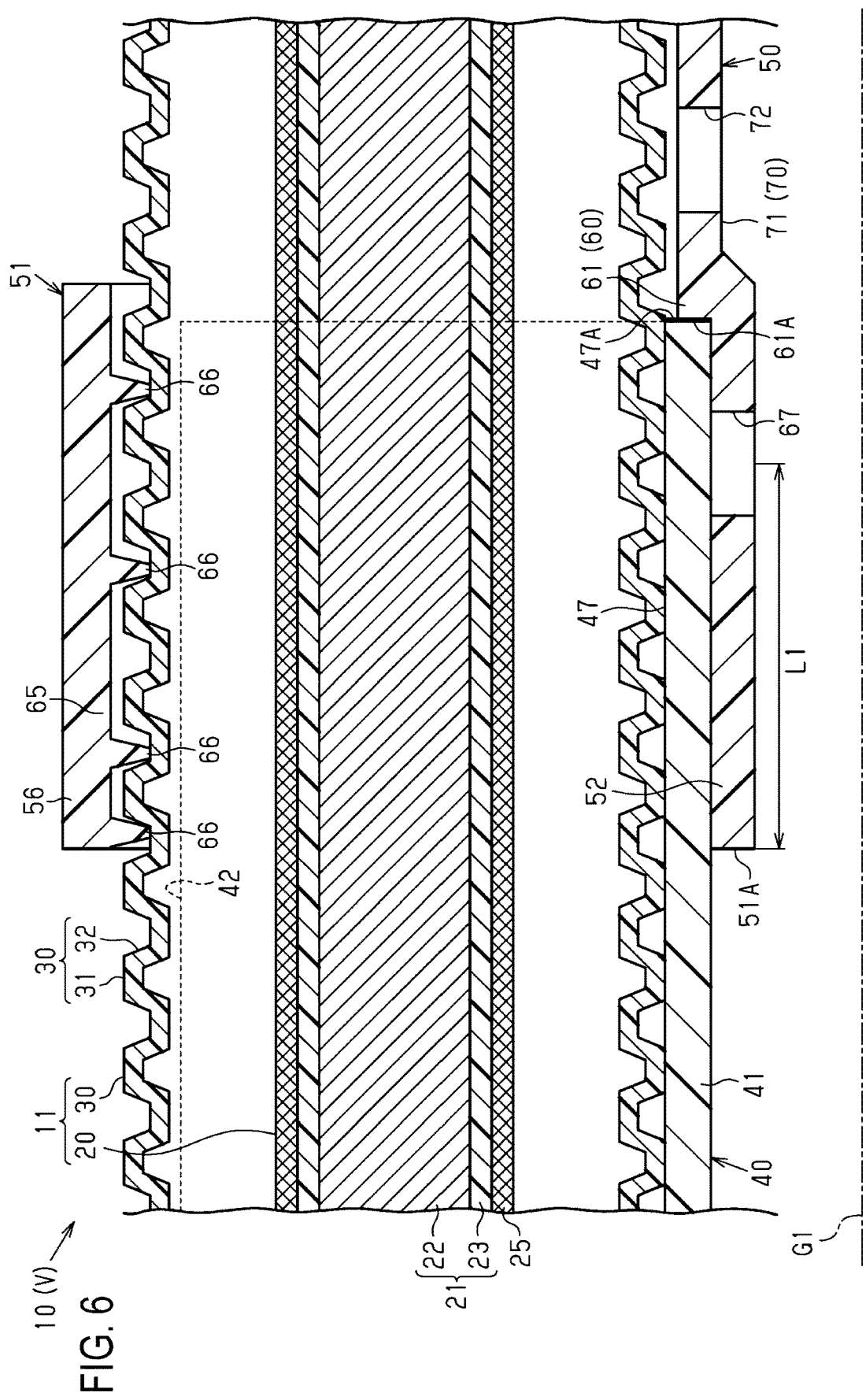
FIG. 6 is a schematic cross-sectional view showing a wire harness according to an embodiment.

As shown in FIG. 6, the end surface 61A in the lengthwise direction of the main-body-side restricting wall 61 opposes, for example, the first main body portion 41 of the first path restricting member 40 in the lengthwise direction of the wire harness main body 11 and can come into contact with the first main body portion 41. The end surface 61A of the main-body-side restricting wall 61 opposes, for example, the first end surface 47A in the lengthwise direction of the first path restricting member 40 in the lengthwise direction of the wire harness main body 11, and can come into contact with the first end surface 47A.

As shown in FIG. 5, the lid-side restricting wall 62 protrudes inward in the radial direction from the inner surface of the lid portion 56. The lid-side restricting wall 62 extends over the entire circumference of the lid 56, for example, in the circumferential direction of the covering portion 51. The transverse cross-sectional shape of the inner surface of the lid-side restricting wall 62 is formed, for example, in a shape corresponding to the outer surface of the first path restricting member 40. The transverse cross-sectional shape of the inner surface of the lid-side restricting wall 62 is formed, for example, in an arc shape or an elliptical arc shape. The transverse cross-sectional shape of the inner surface of the lid-side restricting wall 62 of the present embodiment is formed in a semi-elliptical arc shape.

The lid-side restricting wall 62 opposes, for example, the first end portion 43 and the second end portion 44 of the first path restricting member 40 in the lengthwise direction of the wire harness main body 11 (see FIG. 3), and can come into contact with the first end portion 43 and the second end portion 44.

In this manner, the restricting wall 60 composed of the main-body-side restricting wall 61 and the lid-side restricting wall 62 comes into contact with the first end surface 47A in the lengthwise direction of the first path restricting member 40, whereby movement of the first path restricting member 40 in the lengthwise direction of the wire harness main body 11 is restricted. For example, the restricting wall 60 restricts the movement of the first path restricting member 40 so that the first path restricting member 40 is not inserted into the path restricting portion 70.

As shown in FIG. 4, the covering portion 51 has, for example, a projecting portion 65 (projection). The projecting portion 65 protrudes from the inner surface of the covering portion 51 toward the insertion port 42 of the first path restricting member 40 inserted into the covering portion 51. The projecting portion 65 protrudes so as to be arranged inside the insertion port 42. The projecting portion 65 can come into contact with the first end portion 43 and the second end portion 44 in the circumferential direction of the first path restricting member 40.

The projecting portion 65 is provided on the inner surface of the lid 56, for example. The projecting portion 65 projects from the inner surface of the lid 56 toward the first accommodation port 55, for example. The projecting portion 65 is provided, for example, on the inner surface of the lid portion 56 located on the uppermost side in the vertical direction, in the circumferential direction of the covering portion 51. For this reason, in the state where the projecting portion 65 is arranged inside the insertion port 42, the insertion port 42 faces the lid portion 56 side of the covering portion 51. That is, the insertion port 42 of the present embodiment faces upward in the vertical direction. In other words, the insertion port 42 of the present embodiment is open upward in the vertical direction.

As shown in FIG. 3, the projecting portion 65 extends, for example, along the lengthwise direction of the wire harness body 11. The projecting portion 65 extends, for example, along the lengthwise direction of the covering portion 51 over the entire length of the covering portion 51 in the lengthwise direction. The projecting portion 65 is partially provided, for example, in the circumferential direction of the lid portion 56. The projecting portion 65 is provided, for example, in an intermediate portion in the circumferential direction of the lid portion 56. A portion of the projecting portion 65 constitutes, for example, a lid-side restricting wall 62. For example, the projecting portion 65 provided at one end portion in the lengthwise direction of the covering portion 51 constitutes the lid-side restricting wall 62.

As shown in FIG. 6, the projecting portion 65 has, for example, a protrusion 66 that enters the ring-shaped recess 32 of the exterior member 30. The protrusion 66 is provided so as to further protrude from the protruding leading end surface of the projecting portion 65. A plurality of protrusions 66 are provided in the lengthwise direction of the wire harness main body 11. In the present embodiment, four protrusions 66 are provided in the lengthwise direction of the wire harness main body 11, and each of the protrusions 66 is inserted into a different ring-shaped recess 32.

As shown in FIG. 3, the covering portion 51 has a through hole 67 that passes through the covering portion 51 in the radial direction of the exterior member 30. The through hole 67 is provided in, for example, the second main body portion 52. As shown in FIG. 4, the through hole 67 is provided at a position opposite to the projecting portion 65 in the circumferential direction of the covering portion 51, for example. The through hole 67 is provided, for example, at a position overlapping with the projecting portion 65 in the radial direction of the covering portion 51. The through hole 67 is provided in, for example, the lowermost portion of the second main body portion 52 in the vertical direction when the wire harness 10 is mounted in the vehicle V. The through hole 67 is open downward in the vertical direction, for example, when the wire harness 10 is mounted in the vehicle V. The through hole 67 is open toward, for example, the ground G1.

As shown in FIG. 6, the through hole 67 is partially provided in the lengthwise direction of the covering portion 51. The covering portion 51 of the present embodiment has one through hole 67 in the lengthwise direction of the covering portion 51. The through hole 67 is provided, for example, in an intermediate portion in the lengthwise direction of the covering portion 51. The through hole 67 is provided, for example, spaced apart from the second end surface 51A in the lengthwise direction of the covering portion 51 by a first distance L1 in the lengthwise direction of the wire harness main body 11. Here, the second end surface 51A is an end surface in the lengthwise direction of the second path restricting member 50, and is an end surface of the covering portion 51. The second end surface 51A is provided at the end portion opposite to the restricting wall 60 among the two end portions in the lengthwise direction of the covering portion 51. Also, the first distance L1 can be set to, for example, a distance corresponding to the minimum insertion amount of the first path restricting member 40 required for the covering portion 51 in the lengthwise direction of the wire harness main body 11. The minimum insertion amount of the first path restricting member 40 is, for example, the insertion amount required to prevent the first path restricting member 40 from being detached from the covering portion 51, that is, the overlap width between the connecting portion 47 and the covering portion 51 in the wire harness main body 11. The minimum insertion amount of the first path restricting member 40 is set, for example, according to the ease of movement of the first path restricting member 40 with respect to the covering portion 51 in the lengthwise direction of the wire harness main body 11. For example, if the first path restricting member 40 can freely move with respect to the covering portion 51 in the lengthwise direction of the wire harness main body 11, the minimum insertion amount of the first path restricting member 40 is set to be large. The through hole 67 of the present embodiment is provided at a position closer to the restricting wall 60 out of the second end surface 51A and the restricting wall 60 in the lengthwise direction of the covering portion 51. That is, the through hole 67 of the present embodiment is provided offset toward the restricting wall 60 in the lengthwise direction of the covering portion 51. The through hole 67 of the present embodiment is provided spaced apart from the restricting wall 60 in the lengthwise direction of the covering portion 51.

The planar shape of the through hole 67 as viewed from the penetration direction of the through hole 67 can be any shape. The planar shape of the through hole 67 can be formed into, for example, a circular shape, a semicircular shape, a polygonal shape, a square shape, a flat shape, or the like. The planar shape of the through hole 67 of the present embodiment is formed in a rectangular shape.

Configuration of Path Restricting Portion 70

As shown in FIG. 2, the third main body portion 71 of the path restricting portion 70 extends along the path of the bent section 11B, for example. That is, the third main body portion 71 has a bent shape that follows the shape of the bent section 11B. The third main body 71 covers, for example, a portion of the outer circumference of the exterior member 30 in the circumferential direction. The third main body portion 71 has a tubular shape that covers the outer circumference of the exterior member 30 in a portion in the circumferential direction of the exterior member 30. The third main body portion 71 covers, for example, a range larger than half of the outer circumference of the exterior member 30. The transverse cross-sectional shape of the inner surface of the third main body portion 71 is formed in a shape corresponding to the outer surface of the exterior member 30. The transverse cross-sectional shape of the inner surface of the third main body 71 is formed, for example, in a curved shape. The transverse cross-sectional shape of the inner surface of the third main body portion 71 is U-shaped overall.

The third main body portion 71 has a second accommodation port 63 that is open in a direction orthogonal to the lengthwise direction of the third main body portion 71. The second accommodation port 63 extends along the lengthwise direction of the third main body portion 71 over the entire length in the lengthwise direction of the third main body portion 71. The second accommodation port 63 is in communication with the first accommodation port 55. The accommodation port constituted by the first accommodation port 55 and the second accommodation port 63 extends along the lengthwise direction of the second path restricting member 50 over the entire length in the lengthwise direction of the second path restricting member 50. That is, the accommodation port constituted by the first accommodation port 55 and the second accommodation port 63 is open in a direction orthogonal to the lengthwise direction of the second path restricting member 50, and is open at both ends in the lengthwise direction of the second path restricting member 50.

The opening width of the second accommodation port 63 is, for example, equal to the outer diameter of the exterior member 30 or larger than the outer diameter of the exterior member 30. The exterior member 30 is inserted into the second accommodation port 63 along a direction orthogonal to the lengthwise direction of the second path restricting member 50. Note that the first path restricting member 40 is not inserted into the third main body 71.

As shown in FIG. 3, the path restricting portion 70 has a through hole 72 that passes through the third main body portion 71 in the radial direction of the exterior member 30. As shown in FIG. 6, for example, the through hole 72 is provided in the lowermost portion in the vertical direction of the third main body portion 71 when the wire harness 10 is mounted in the vehicle V. The through hole 72 is open downward in the vertical direction, for example, when the wire harness 10 is mounted in the vehicle V. The through hole 72 is open toward the ground G1, for example.

As shown in FIG. 3, the through hole 72 is partially provided in the lengthwise direction of the path restricting portion 70. The path restricting portion 70 of the present embodiment has one through hole 72 in the lengthwise direction of the path restricting portion 70. The through hole 72 is provided, for example, in an intermediate portion in the lengthwise direction of the path restricting portion 70. The through hole 72 is provided side by side with the through hole 67, for example, along the lengthwise direction of the wire harness main body 11. The through hole 72 is provided, for example, offset toward the second main body portion 52 in the lengthwise direction of the path restricting portion 70. As shown in FIG. 6, the through hole 72 is provided opposite to the through hole 67, for example, in the lengthwise direction of the second path restricting member 50, with the end surface 61A of the main-body-side restricting wall 61 in between. For example, the through hole 72 is provided spaced apart from the end surface 61A of the main-body-side restricting wall 61 by the same distance as the through hole 67 in the lengthwise direction of the second path restricting member 50.

The planar shape of the through hole 72 viewed from the through direction of the through hole 72 can be any shape. The planar shape of the through hole 72 can be formed into, for example, a circular shape, a semicircular shape, a polygonal shape, a square shape, a flat shape, or the like. The planar shape of the through hole 72 of the present embodiment is formed in a rectangular shape.

Configuration of Fixing Members 81 and 82

As shown in FIG. 2, the wire harness 10 has, for example, a fixing member 81 for fixing the first path restricting member 40 to the outer circumference of the exterior member 30. The wire harness 10 has, for example, a fixing member 82 for fixing the second path restricting member 50 to the outer circumference of the exterior member 30. As the fixing members 81 and 82, for example, cable ties made of resin or metal, caulking rings, adhesive tape, or the like can be used. The fixing members 81 and 82 of this embodiment are adhesive tape.

The fixing member 81 is formed so as to fix, for example, the end portion provided opposite to the connecting portion 47 out of the end portions in the lengthwise direction of the first path restricting member 40 to the outer surface of the exterior member 30. The fixing member 81 is wound, for example, from the outer surface of the end portion in the lengthwise direction of the first path restricting member 40 over the outer surface of the exterior member 30. As a result, it is possible to suppress movement of the first path restricting member 40 with respect to the exterior member 30 in the lengthwise direction and the circumferential direction of the wire harness main body 11. The fixing member 82 is formed so as to fix, for example, the end portion provided opposite to the covering portion 51 out of the end portions in the lengthwise direction of the second path restricting member 50 to the outer surface of the exterior member 30. The fixing member 82 is wound, for example, from the outer surface of the end portion in the lengthwise direction of the second path restricting member 50 over the outer surface of the exterior member 30. As a result, it is possible to suppress movement of the second path restricting member 50 with respect to the exterior member 30 in the lengthwise direction and the circumferential direction of the wire harness main body 11.

Next, the operation of this embodiment will be described.

In the lengthwise direction of the wire harness main body 11, the connecting portion 47 of the first path restricting member 40 and the covering portion 51 of the second path restricting member 50 are provided so as to overlap with each other. At this time, the covering portion 51 that covers the outer circumference of the connecting portion 47 is provided with a through hole 67 that passes through the covering portion 51 in the radial direction of the exterior member 30. As a result, for example, even if a liquid such as water enters between the outer surface of the connecting portion 47 and the inner surface of the covering portion 51, the liquid can be discharged from the through hole 67 to the outside of the second path restricting member 50.

Next, the effect of this embodiment will be described.

(1) The covering portion 51 that covers the outer circumference of the connecting portion 47 is provided with a through hole 67 that passes through the covering portion 51 in the radial direction of the exterior member 30. According to this configuration, since the above-mentioned action is exhibited, it is possible to suppress the accumulation of liquid between the outer surface of the connecting portion 47 and the inner surface of the covering portion 51. Accordingly, it is possible to suitably suppress detachment of the second path restricting member 50 from the first path restricting member 40 caused by the weight of the liquid accumulated between the outer surface of the connecting portion 47 and the inner surface of the covering portion 51. As a result, the connection reliability between the first path restricting member 40 and the second path restricting member 50 can be improved.

(2) The insertion port 42 of the first path restricting member 40 is open in a direction orthogonal to the lengthwise direction of the first path restricting member 40 and extends over the entire length in the lengthwise direction of the first path restricting member 40. This makes it possible to attach the first path restricting member 40 from the insertion port 42 to the exterior member 30 after performing terminal processing such as attaching connectors C1 and C2 to the end portions in the lengthwise direction of the electric wire members 20. In this manner, since the first path restricting member 40 can be retrofitted, it is possible to improve the assembly workability of the wire harness 10.

(3) The through hole 67 is provided in the covering portion 51 of the portion covering the outer circumference of the first main body portion 41. Here, the liquid is more likely to accumulate between the outer surface of the first main body portion 41 and the inner surface of the covering portion 51 than between the insertion port 42 and the inner surface of the covering portion 51. Accordingly, since the through hole 67 is provided in the portion where the liquid is likely to accumulate, the liquid can be suitably discharged to the outside of the second path restricting member 50 through the through hole 67. As a result, it is possible to suitably suppress detachment of the second path restricting member 50 from the first path restricting member 40, and it is possible to improve the connection reliability between the first path restricting member 40 and the second path restricting member 50.

(4) The through hole 67 is open downward in the vertical direction when the wire harness 10 is mounted on the vehicle V. According to this configuration, since the through hole 67 is open downward in the vertical direction, the liquid that has entered between the outer surface of the connection portion 47 and the inner surface of the covering portion 51 can be efficiently discharged to the outside of the second path restricting member 50 through the through hole 67.

(5) In the lengthwise direction of the wire harness main body 11, the first end surface 47A in the lengthwise direction of the first path restricting member 40 is engaged with the restricting wall 60 of the second path restricting member 50. As a result, the relative movement of the first path restricting member 40 with respect to the second path restricting member 50 is suppressed in the lengthwise direction of the wire harness main body 11. For this reason, it is possible to suppress misalignment of the first path restricting member 40 with respect to the second path restricting member 50 in the lengthwise direction of the wire harness main body 11. As a result, the positional accuracy of the first path restricting member 40 with respect to the second path restricting member 50 can be improved. Here, in the present embodiment, the second path restricting member 50 is fixed to the exterior member 30 of the wire harness main body 11 by the fixing member 82. For this reason, movement of the second path restricting member 50 with respect to the wire harness main body 11 is suppressed in the lengthwise direction of the wire harness main body 11. Accordingly, by improving the positional accuracy of the first path restricting member 40 with respect to the second path restricting member 50, the positional accuracy of the first path restricting member 40 with respect to the wire harness main body 11 can be improved. As a result, the first path restricting member 40 can be suitably arranged at a desired position of the wire harness main body 11, here the straight section 11A, and the path of the straight section 11A can be suitably restricted by the first path restricting member 40. In other words, it is possible to suitably suppress deviation of the installation position of the first path restricting member 40 with respect to the wire harness main body 11 from the straight section 11A.

(6) When the first path restricting member 40 is attached to the second path restricting member 50, the first path restricting member 40 can be easily positioned with respect to the second path restricting member 50 in the lengthwise direction of the wire harness main body 11 by engaging the first end portion 47A in the lengthwise direction of the first path restricting member 40 with the restricting wall 60.

(7) The through hole 67 is provided spaced apart from the second end surface 51A in the lengthwise direction of the covering portion 51 by the first distance L1 corresponding to the minimum insertion amount of the first path restricting member 40 required for the covering portion 51. For this reason, the through hole 67 can be used as a confirming hole for confirming the insertion amount of the first path restricting member 40 into the covering portion 51, specifically, the insertion amount of the first path restricting member 40 in the lengthwise direction of the wire harness main body 11. That is, even from the outside of the second path restricting member 50, the insertion amount of the first path restricting member 40 into the covering portion 51 can be confirmed through the through hole 67. For example, if it can be confirmed that the first path restricting member 40 has been inserted up to the through hole 67 through the through hole 67, it is possible to confirm that the first path restricting member 40 is inserted by the minimum insertion amount required for the covering portion 51 or more.

(8) The through hole 67 is provided offset toward the restricting wall 60 in the lengthwise direction of the covering portion 51. According to this configuration, for example, the through hole 67 is provided in the vicinity of the restricting wall 60 used as a positioning member of the first path restricting member 40 in the lengthwise direction of the wire harness main body 11. For this reason, for example, it can be confirmed whether or not the first path restricting member 40 has been inserted up to the vicinity of the restricting wall 60 in the lengthwise direction of the wire harness main body 11 through the through hole 67.

(9) The second path restricting member 50 has a through hole 72 that passes through the path restricting portion 70 in the radial direction of the exterior member 30. The through hole 72 is provided side by side with the through hole 67 along the lengthwise direction of the second path restricting member 50. For this reason, the insertion amount of the first path restricting member 40 with respect to the second path restricting member 50 can be suitably confirmed by the position of the first path restricting member 40 that can be confirmed through the through hole 67 and the through hole 72.

(10) The covering portion 51 is formed in a ring shape that collectively encloses the connecting portion 47 and the exterior member 30. The covering portion 51 has a second main body portion 52 that covers a portion of the outer circumference of the first main body portion 41, and a lid portion 56 that is coupled to the second main body portion 52. According to this configuration, the second path restricting member 50 including the covering portion 51 can be retrofitted to the first path restricting member 40 and the exterior member 30 due to the covering portion 51 having a ring shape enclosing the connecting portion 47 and the exterior member 30 while the covering portion 51 is divided into the second main body portion 52 and the lid portion 56. As a result, the assembly workability of the wire harness 10 can be further improved.

(11) The covering portion 51 has a projecting portion 65 that can come into contact with at least one of the first end portion 43 and the second end portion 44 that form the insertion port 42 in the circumferential direction of the first path restricting member 40. For this reason, the projecting portion 65 and the first end portion 43 or the second end portion 44 are engaged with each other in the circumferential direction of the first path restricting member 40. Due to the engagement of these portions, relative movement of the first path restricting member 40 with respect to the covering portion 51 is suppressed in the circumferential direction of the first path restricting member 40. That is, due to the projecting portion 65 and the first end portion 43 or the second end portion 44 being engaged with each other, it is possible to suppress rotation of the first path restricting member 40 in the circumferential direction with respect to the covering portion 51. For this reason, it is possible to suppress misalignment of the first path restricting member 40 with respect to the covering portion 51 in the circumferential direction of the first path restricting member 40, and the positional accuracy of the first path restricting member 40 with respect to the covering portion 51 can be improved.

(12) Since the projecting portion 65 has protrusions 66 that enter the ring-shaped recesses 32 of the exterior member 30, it is possible to suppress movement of the exterior member 30 with respect to the second path restricting member 50 in the lengthwise direction of the exterior member 30.

(13) The first path restricting member 40 has a protruding portion 45 that protrudes from the inner surface of at least one of the first end portion 43 and the second end portion 44 and can come into contact with the outer surface of the exterior member 30. With this protruding portion 45, for example, the exterior member 30 can be pressed from the outside of the exterior member 30. For this reason, detachment of the first path restricting member 40 from the exterior member 30 through the insertion port 42 can be suitably suppressed.

(14) The path of the straight section 11A is restricted by the first path restricting member 40, and the path of the bent section 11B is restricted by the second path restricting member 50. As a result, it is possible to suppress deviation of the path of the straight section 11A and the path of the bent section 11B from the desired paths.

OTHER EMBODIMENTS

The above embodiment can be modified and implemented as follows. The above embodiment and the following modifications can be implemented in combination with each other as long as no contradiction arises.

There is no particular limitation on the formation position of the through hole 67 in the above-described embodiment. For example, the formation position of the through hole 67 in the circumferential direction of the covering portion 51 can be appropriately changed to any position. For example, the through hole 67 may also be provided in the lid portion 56 of the covering portion 51. In this case, it is preferable that the lid portion 56 is provided below the second main body portion 52 in the vertical direction when the wire harness 10 is mounted in the vehicle V.

Also, the formation position of the through hole 67 in the lengthwise direction of the covering portion 51 can be appropriately changed to any position.

Figure 7:
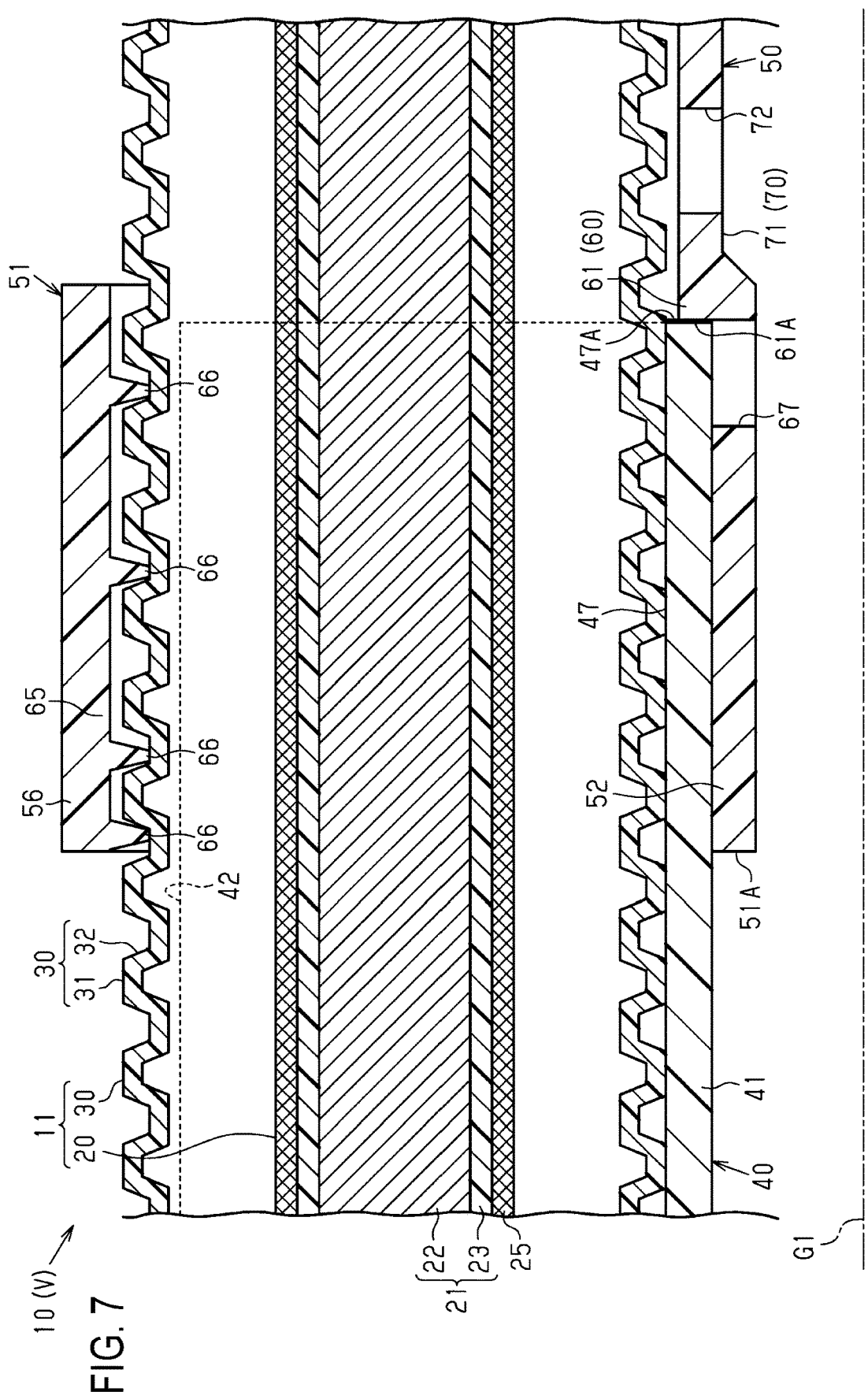
FIG. 7 is a schematic cross-sectional view showing a wire harness according to a modified example.

For example, as shown in FIG. 7, the through hole 67 may also be provided so as to be adjacent to the restricting wall 60 in the lengthwise direction of the covering portion 51. The through hole 67 may also be provided so as to be adjacent to the main-body-side restricting wall 61 in the lengthwise direction of the covering portion 51. For example, the through hole 67 may be provided such that the inner surface of a portion of the through hole 67 and the end surface 61A of the main-body-side restricting wall 61 extend continuously with each other.

For example, if the end portion in the lengthwise direction of the first path restricting member 40 is fixed to the outer surface of the exterior member 30 by the fixing member 81 as in the above-described embodiment, movement of the first path restricting member 40 in the lengthwise direction of the wire harness main body 11 is restricted. For this reason, the through hole 67 may be provided at a position offset toward the second end surface 51A in the lengthwise direction of the covering portion 51.

If the through hole 67 is not used as a hole for confirming the insertion amount of the first path restricting member 40 into the covering portion 51, the through hole 67 does not need to be provided at a position spaced apart from the second end surface 51A of the covering portion 51 by the first distance L1. In this case, for example, the through hole 67 may be provided at a position offset to the second end surface 51A in the lengthwise direction of the covering portion 51. For example, the through hole 67 may be provided such that a notch is formed in the second end surface 51A.

In the above-described embodiment, one through hole 67 was provided in the covering portion 51, but the present disclosure is not limited to this, and a plurality of through holes 67 may also be provided in the covering portion 51.

Figure 8:
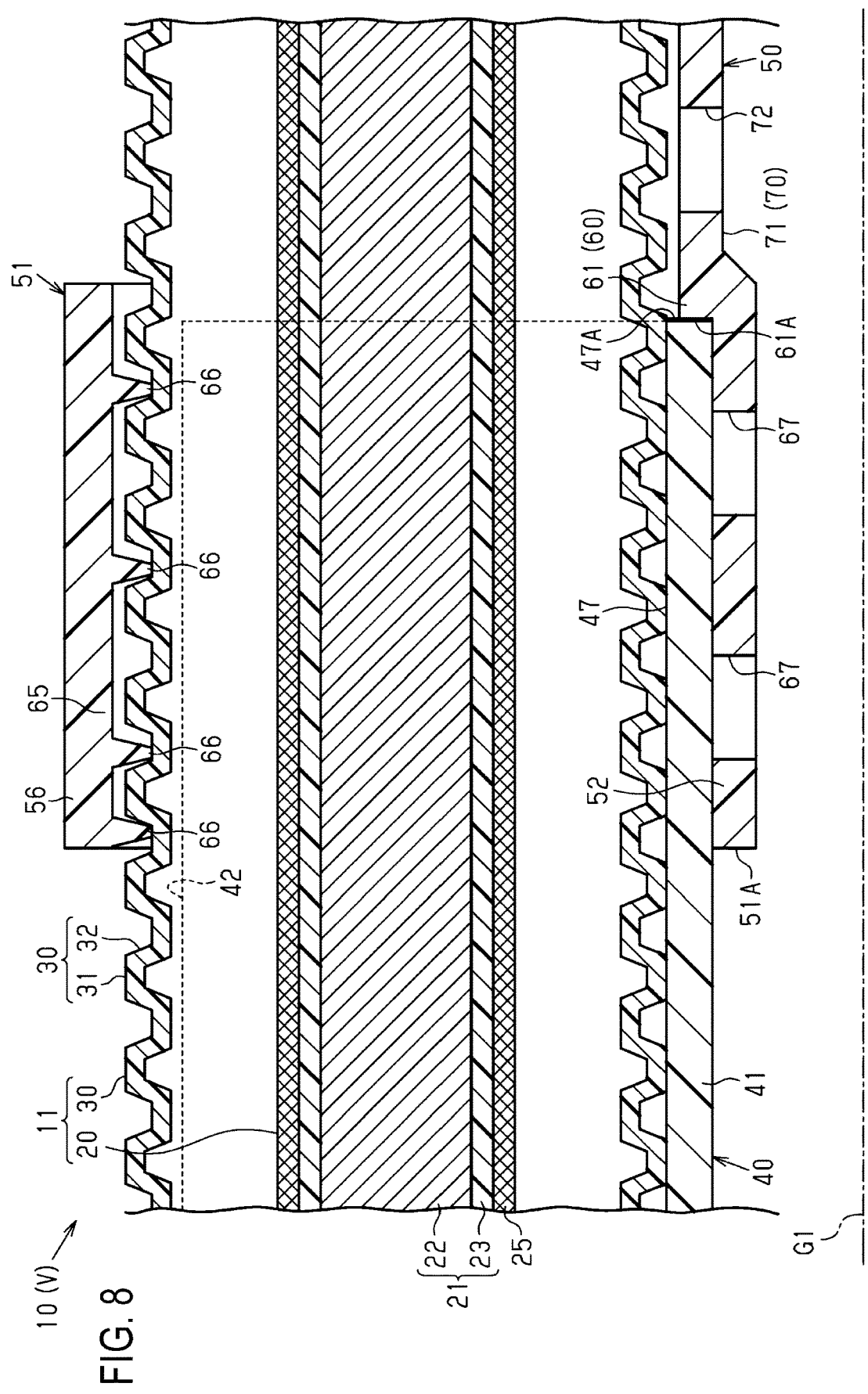
FIG. 8 is a schematic cross-sectional view showing a wire harness according to a modified example.

For example, as shown in FIG. 8, the covering portion 51 may be provided with two through holes 67. Both of the two through holes 67 are provided in the second main body portion 52. The two through holes 67 are provided side by side, for example, along the lengthwise direction of the covering portion 51.

According to this configuration, a plurality of through holes 67 are provided side by side along the lengthwise direction of the covering portion 51. For this reason, by confirming the position of the first path restricting member 40 through the plurality of through holes 67, it is possible to suitably confirm how far the first path restricting member 40 has been inserted into the second path restricting member 50.

In the above-described embodiment, the second path restricting member 50 may be provided on both sides in the lengthwise direction of the first path restricting member 40. At this time, for example, the first path restricting member 40 easily moves along the lengthwise direction of the wire harness main body 11 between the one second path restricting member 50 and the other second path restricting member 50 in some cases. In this case, for example, the minimum insertion amount of the first path restricting member 40 into the covering portion 51 is set to be large.

The structure of the second path restricting member 50 of the above-described embodiment can be changed as appropriate. For example, as long as the second path restricting member 50 has a structure that covers the connecting portion 47 and has the covering portion 51 provided with the through hole 67, there is no particular limitation on the other structures.

The through hole 72 of the path restricting portion 70 may also be omitted.

The protrusions 66 of the lid portion 56 may also be omitted.

The projecting portion 65 of the lid portion 56 may also be omitted.

At least one of the main-body-side restricting wall 61 and the lid-side restricting wall 62 may be omitted.

In the covering portion 51 of the above-described embodiment, the second main body portion 52 and the lid portion 56 are formed in one piece with each other, but there is no limitation to this, and the second main body portion 52 and the lid portion 56 may also be separate from each other. That is, the second main body portion 52 and the lid portion 56 may be separate components.

The lid portion 56 of the covering portion 51 may also be omitted.

The bent shape of the path restricting portion 70 can be changed as appropriate.

The transverse cross-sectional shape of the inner surface of the second main body portion 52 and the third main body portion 71 is not limited to a U shape, and can be changed to, for example, an arc shape, an elliptical arc shape, or the like.

A lid portion to be coupled to the third main body portion 71 may be provided.

The second path restricting member 50 of the above-described embodiment was formed so as to restrict the path of the bent section 11B of the wire harness main body 11, but there is no limitation to this. For example, the second path restricting member 50 may be changed to a shape that restricts the path of the straight section 11A of the wire harness main body 11. The second path restricting member 50 in this case is changed to, for example, a shape in which the bending shape of the path restricting portion 70 extends linearly.

In the above-described embodiment, the second path restricting member 50 is embodied as an attachment member having a covering portion 51, but there is no limitation to this. For example, the attachment member may be embodied in a structure having only the covering portion 51.

The structure of the first path restricting member 40 of the above-described embodiment can be changed as appropriate. For example, as long as the first path restricting member 40 has the insertion port 42 and has a structure that can be attached to the outer circumference of the exterior member 30, there is no particular limitation to the other structures.

Each protruding portion 45 of the above-described embodiment may be provided at a position farther from the insertion port 42 than the leading ends 43A and 44A in the circumferential direction of the first path restricting member 40.

Each protruding portion 45 may be partially provided in the lengthwise direction of the first path restricting member 40.

At least one of the two protruding portions 45 may be omitted.

The first path restricting member 40 may be provided with a second protruding portion that protrudes from the inner surface of the intermediate portion in the circumferential direction of the first main body portion 41 and can come into contact with the outer surface of the exterior member 30. According to this configuration, the protruding portion 45 and the second protruding portion can be brought into contact with the outer surface of the exterior member 30 together. Therefore, rattling of the first path restricting member 40 can be suppressed.

In the first path restricting member 40, a groove extending along the lengthwise direction may be provided on the outer surface of the first main body portion 41. According to this configuration, the first main body portion 41 is easily deformed to the outer peripheral side using the groove as a starting point, whereby the insertion opening 42 can be more easily expanded. As a result, it is possible to contribute to the improvement of the assemblability of the first path restricting member 40.

The thickness in the radial direction of the first main body portion 41 may be changed in the circumferential direction.

The transverse cross-sectional shape of the first main body portion 41 is not limited to an arc shape, but can be changed to, for example, an elliptical arc shape, a U shape, or the like.

In the above-described embodiment, the first path restricting member 40 and the second path restricting member 50 were more rigid than the exterior member 30, but there is no limitation to this, and the hardness may be less than or equal to that of the exterior member 30. That is, if the first path restricting member 40 and the second path restricting member 50 act so that the wire harness main body 11 is less likely to bend than the wire harness main body 11 in the state where the first path restricting member 40 and the second path restricting member 50 are not attached, the first path restricting member 40 and the second path restricting member 50 need not be more rigid than the exterior member 30.

At least one of the fixing members 81 and 82 in the above-described embodiment may be omitted.

For example, the exterior member 30 in the above-described embodiment may be a resin corrugated tube with a metal layer that contains a metal material, formed on the outer surface thereof.

The exterior member 30 in the above-described embodiment is not limited to being a corrugated tube, and may be an exterior member that is not provided with an annular protrusion 31 or an annular recess 32, for example.

The exterior member 30 in the above-described embodiment may have a slit that extends in the lengthwise direction of the exterior member 30.

Although the electric wires 21 in the above-described embodiment are high-voltage electric wires, the present disclosure is not limited to such a configuration. For example, the electric wires 21 may be low-voltage electric wires.

In the electric wire member 20 in the above-described embodiment, an electromagnetic shield member is embodied as the braided member 25. However, the present disclosure is not limited to such a configuration. For example, the electromagnetic shield member in the electric wire member 20 may be embodied as a metal foil.

The braided member 25 of the electric wire member 20 in the above-described embodiment may be omitted.

In the above-described embodiment, the number of electric wires 21 included in the electric wire member 20 is two. However, the present disclosure is not limited to such a configuration. The number of electric wires 21 may be one or three or more.

The positional relationship between the inverter M1 and the high-voltage battery M2 in the vehicle V is not limited to that in the above-described embodiment, and may be changed as appropriate depending on the vehicle configuration.

In the above-described embodiment, a plurality of on-board devices to which the wire harness 10 is to be electrically connected are embodied as the inverter M1 and the high-voltage battery M2. However, the present disclosure is not limited to such a configuration. The plurality of on-board devices to which the wire harness 10 is to be electrically connected are not particularly limited as long as they are electric devices to be mounted in the vehicle V.

The embodiments disclosed herein are illustrative in all aspects and should not be considered restrictive. The scope of the present disclosure is indicated by the scope of claims, not the above-mentioned meaning, and is intended to include all modifications within the meaning and scope equivalent to the scope of claims.

What is claimed is:

1. A wire harness comprising:
a wire harness main body including an electric wire and an exterior tube enclosing an outer circumference of the electric wire;
a path restricting cover that is attached to an outer circumference of the exterior tube and restricts a path of the wire harness main body; and
an attachment attached to an outer circumference of a portion in a lengthwise direction of the path restricting cover, wherein
the path restricting cover and the attachment restrict the path along which the wire harness main body is routed,
the path restricting cover includes a first main body that encloses a portion of the outer circumference of the exterior tube, and an insertion port that is open in a direction orthogonal to a lengthwise direction of the first main body and extends along an entire length in the lengthwise direction of the first main body,
the path restricting cover includes a connection that is connected to the attachment,
the attachment includes a cover that covers an outer circumference of the connection,
the cover includes a through hole that passes through the cover in a radial direction of the exterior tube,
the cover includes a restricting wall that engages with a first end surface in the lengthwise direction of the path restricting cover in a lengthwise direction of the wire harness main body,
the restricting wall is provided at one end in a lengthwise direction of the cover,
the cover includes a second end surface of an end opposite to the restricting wall out of the two ends in the lengthwise direction of the cover,
the through hole is provided spaced apart from the second end surface by a first distance in the lengthwise direction of the wire harness main body, and
the first distance is a distance corresponding to a minimum insertion amount of the path restricting cover with respect to the cover in the lengthwise direction of the wire harness main body.

2. The wire harness according to claim 1, wherein the through hole is provided in a portion covering an outer circumference of the first main body in a circumferential direction of the cover.

3. The wire harness according to claim 1, wherein the through hole is open downward in a vertical direction when the wire harness is mounted in a vehicle.

4. The wire harness according to claim 1, wherein the through hole is provided offset toward the restricting wall in the lengthwise direction of the cover.

5. The wire harness according to claim 1, wherein the through hole is a plurality of through holes, and the plurality of through holes are provided side by side along the lengthwise direction of the cover.

6. The wire harness according to claim 1, wherein
the path restricting cover is a first path restricting cover,
the attachment is a second path restricting cover that is attached to the outer circumference of the exterior tube and restricts the path of the wire harness main body,
the connection is provided at an end in the lengthwise direction of the first path restricting cover,
the cover is provided at an end in the lengthwise direction of the second path restricting cover,
the first path restricting cover restricts a path of a straight section, which is a section having a linear shape in the path of the wire harness main body, and
the second path restricting cover restricts a path of a bend, which is a section that is bent in the path of the wire harness main body.

7. The wire harness according to claim 1, further comprising:
a first connector; and
a second connector, wherein
the first connector and the second connector are respectively attached to ends of the electric wire, and are respectively connected to a vehicle.

8. A wire harness comprising:
a wire harness main body including an electric wire and an exterior tube enclosing an outer circumference of the electric wire;
a path restricting cover that is attached to an outer circumference of the exterior tube and restricts a path of the wire harness main body; and
an attachment attached to an outer circumference of a portion in a lengthwise direction of the path restricting cover, wherein
the path restricting cover and the attachment restrict the path along which the wire harness main body is routed,
the path restricting cover includes a first main body that encloses a portion of the outer circumference of the exterior tube, and an insertion port that is open in a direction orthogonal to a lengthwise direction of the first main body and extends along an entire length in the lengthwise direction of the first main body,
the path restricting cover includes a connection that is connected to the attachment,
the attachment includes a cover that covers an outer circumference of the connection,
the cover includes a through hole that passes through the cover in a radial direction of the exterior tube,
the cover is formed in a ring shape enclosing all the way around the outer circumference of the connection and the outer circumference of the exterior tube at a portion to which the connection is attached,
the cover includes a second main body that covers a portion of the outer circumference of the first main body and a lid that is coupled to the second main body,
the path restricting cover includes a first end and a second end that are two ends in the circumferential direction of the first main body and form the insertion port,
the cover has a projection that protrudes from an inner surface of the lid to the insertion port, and
the projection contacts at least one of the first end and the second end in the circumferential direction of the path restricting cover.

9. The wire harness according to claim 8, wherein
the exterior tube is a corrugated tube having an accordion shape in which a ring-shaped protrusion and a ring-shaped recess are alternatingly continuous with each other in a lengthwise direction of the exterior tube, and
the projection has a protrusion that enters the ring-shaped recess.

10. The wire harness according to claim 8, further comprising:
a first connector; and
a second connector, wherein
the first connector and the second connector are respectively attached to ends of the electric wire, and are respectively connected to a vehicle.

* * * * *